United States Patent
Kurachi et al.

(10) Patent No.: US 11,518,437 B2
(45) Date of Patent: Dec. 6, 2022

(54) VEHICULAR CONTROL DEVICE, CONTROL METHOD, NON-TEMPORARY STORAGE MEDIUM, AND VEHICLE

(71) Applicant: TOYOTA JIDOSHA KABUSHIKI KAISHA, Toyota (JP)

(72) Inventors: Saeko Kurachi, Toyota (JP); Sunao Horitake, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 227 days.

(21) Appl. No.: 17/143,242

(22) Filed: Jan. 7, 2021

(65) Prior Publication Data

US 2021/0229744 A1     Jul. 29, 2021

(30) Foreign Application Priority Data

Jan. 23, 2020   (JP) ............................. JP2020-009111

(51) Int. Cl.
| | |
|---|---|
| *B62D 15/02* | (2006.01) |
| *B60L 58/16* | (2019.01) |
| *B60L 58/12* | (2019.01) |
| *B60W 10/26* | (2006.01) |
| *B60W 10/20* | (2006.01) |

(52) U.S. Cl.
CPC .......... *B62D 15/0235* (2013.01); *B60L 58/12* (2019.02); *B60L 58/16* (2019.02); *B60W 10/20* (2013.01); *B60W 10/26* (2013.01)

(58) Field of Classification Search
CPC ... G01F 15/06; B62D 15/0235; B62D 5/0469; B62D 5/04; B62D 15/021; B60L 58/12; B60L 58/16; B60W 10/20; B60W 10/26; Y02E 60/10; Y02T 10/70; B60R 16/033; G01R 31/374; G01R 31/378; G01R 31/382; H01M 10/44; H01M 10/443; H01M 10/48; H01M 10/486
See application file for complete search history.

(56) References Cited

U.S. PATENT DOCUMENTS

| | | | | |
|---|---|---|---|---|
| 8,843,333 | B2* | 9/2014 | Tezuka | B60L 3/12 |
| | | | | 702/63 |
| 10,183,588 | B2* | 1/2019 | Jin | H01M 10/486 |
| 2007/0233345 | A1* | 10/2007 | Endo | B62D 5/049 |
| | | | | 701/41 |

(Continued)

FOREIGN PATENT DOCUMENTS

JP     2019-125558 A     7/2019

*Primary Examiner* — Tung S Lau
(74) *Attorney, Agent, or Firm* — Oblon, McClelland, Maier & Neustadt, L.L.P.

(57) ABSTRACT

A vehicular control device includes a determining unit configured to determine whether an absolute value of a steering angle as a rotation angle of a steering wheel exceeds a first threshold value, an estimating unit configured to estimate a lithium deposition amount as an amount of lithium metal deposited on the lithium-ion battery by regenerative current flowing into the lithium-ion battery, based on vehicle information obtained from the vehicle, when the determining unit determines that the absolute value of the steering angle exceeds the first threshold value, and a reporting command unit configured to give a command to report that the vehicle is in a first state, based on the lithium deposition amount estimated by the estimating unit.

9 Claims, 3 Drawing Sheets

(56) References Cited

U.S. PATENT DOCUMENTS

| | | | |
|---|---|---|---|
| 2008/0119986 A1* | 5/2008 | Wei | B62D 15/0245 |
| | | | 701/41 |
| 2012/0215472 A1* | 8/2012 | Tezuka | G01R 31/392 |
| | | | 702/63 |
| 2013/0076363 A1* | 3/2013 | Takahashi | H01M 10/48 |
| | | | 324/427 |
| 2016/0190658 A1* | 6/2016 | Ishibashi | H02J 7/005 |
| | | | 324/432 |
| 2019/0229382 A1 | 7/2019 | Machida et al. | |

* cited by examiner

VEHICULAR CONTROL DEVICE, CONTROL METHOD, NON-TEMPORARY STORAGE MEDIUM, AND VEHICLE

CROSS-REFERENCE TO RELATED APPLICATION

This application claims priority to Japanese Patent Application No. 2020-009111 filed on Jan. 23, 2020, incorporated herein by reference in its entirety.

BACKGROUND

1. Technical Field

The disclosure relates to a vehicular control device used in a vehicle on which a lithium-ion battery is installed, and also relates to a control method, a non-temporary storage medium, and a vehicle.

2. Description of Related Art

When the lithium-ion battery is further charged in a condition where the state of charge (SOC) is high, a phenomenon (lithium deposition, or deposition of lithium metal) that leads to battery deterioration may appear. Therefore, it has been proposed to control the state of charge of the lithium-ion battery so as to curb occurrence of lithium deposition, or proposed to estimate the lithium deposition amount so as to detect an appropriate time for change of the lithium-ion battery, for example.

A power supply system using a lithium-ion battery is disclosed in Japanese Unexamined Patent Application Publication No. 2019-125558 (JP 2019-125558 A). In the system described in JP 2019-125558 A, allowable current is calculated according to the temperature of the lithium-ion battery, and the lithium-ion battery is charged within a range of the calculated allowable current, so that the state of charge of the lithium-ion battery does not exceed a predetermined high value.

SUMMARY

The charge control using the allowable current as described in JP 2019-125558 A is effective with respect to charging current that can be detected by a current sensor. However, in a vehicle that adopts an electric power steering system (EPS), regenerative current generated from an EPS motor, due to steering (which will be called "full-lock steering") performed by the driver to rotate the steering wheel to the maximum steering position in the counterclockwise direction or clockwise direction, for example, flows into the lithium-ion battery for a short period of time, e.g., about 30 milliseconds. Thus, it is difficult for a current sensor having a large detection cycle, such as 100 milliseconds, to detect the regenerative current generated from the EPS motor due to the full-lock steering of the steering wheel. If the accuracy with which the current sensor detects the charging current of the lithium-ion battery is reduced, the accumulated lithium deposition amount obtained by estimation may deviate from the actual accumulated lithium deposition amount, and the system may not be able to report the appropriate time for change of the lithium-ion battery.

This disclosure provides a lithium-ion battery control device that can appropriately determine conditions of a lithium-ion battery, and can favorably report that the lithium-ion battery needs to be changed or replaced with a new one.

A first aspect of the disclosure is a vehicular control device used in a vehicle on which a lithium-ion battery is installed. The vehicular control device includes a determining unit configured to determine whether an absolute value of a steering angle as a rotation angle of a steering wheel exceeds a first threshold value, an estimating unit configured to estimate a lithium deposition amount as an amount of lithium metal deposited on the lithium-ion battery by regenerative current flowing into the lithium-ion battery, based on vehicle information obtained from the vehicle, when the determining unit determines that the absolute value of the steering angle exceeds the first threshold value, and a reporting command unit configured to give a command to report that the vehicle is in a first state, based on the lithium deposition amount estimated by the estimating unit.

In the first aspect, the determining unit may be configured to determine whether the absolute value of the steering angle exceeds the first threshold value, based on steering angle information obtained from a steering angle sensor installed on the vehicle.

In the first aspect, the reporting command unit may be configured to report that the vehicle is in the first state, when the lithium deposition amount estimated by the estimating unit is accumulated, and the accumulated lithium deposition amount reaches a second threshold value.

In the first aspect, the vehicle information may include at least one of a steering angle speed measured when the steering wheel is operated, a temperature of the lithium-ion battery, and a state of charge of the lithium-ion battery.

In the first aspect, the first state may be a state in which the lithium-ion battery needs to be changed.

In the first aspect, the reporting command unit may be configured to report that the vehicle is in the first state, to at least one of a user of the vehicle, a dealer of the vehicle, and a vehicle management center configured to conduct communications with the vehicle.

A second aspect of the disclosure is a control method executed by a computer of a vehicular control device used in a vehicle on which a lithium-ion battery is installed. The control method includes the steps of: determining whether an absolute value of a steering angle as a rotation angle of a steering wheel exceeds a first threshold value, estimating a lithium deposition amount as an amount of lithium metal deposited on the lithium-ion battery by regenerative current flowing into the lithium-ion battery, based on vehicle information obtained from the vehicle, when the absolute value of the steering angle exceeds the first threshold value, and giving a command to report that the vehicle is in a first state, based on the lithium deposition amount.

A third aspect of the disclosure is a non-temporary storage medium storing commands executable by one processor or a plurality of processors of a vehicular control device used in a vehicle on which a lithium-ion battery is installed. The commands cause the one processor or processors to execute steps of: determining whether an absolute value of a steering angle as a rotation angle of a steering wheel exceeds a first threshold value, estimating a lithium deposition amount as an amount of lithium metal deposited on the lithium-ion battery by regenerative current flowing into the lithium-ion battery, based on vehicle information obtained from the vehicle, when the absolute value of the steering angle exceeds the first threshold value, and giving a command to report that the vehicle is in a first state, based on the lithium deposition amount.

A fourth aspect of the disclosure is a vehicle on which a lithium-ion battery is installed, and which includes a vehicular control device. The vehicular control device includes a determining unit configured to determine whether an absolute value of a steering angle as a rotation angle of a steering wheel exceeds a first threshold value, an estimating unit configured to estimate a lithium deposition amount as an amount of lithium metal deposited on the lithium-ion battery by regenerative current flowing into the lithium-ion battery, based on vehicle information obtained from the vehicle, when the determining unit determines that the absolute value of the steering angle exceeds the first threshold value, and a reporting command unit configured to give a command to report that the vehicle is in a first state, based on the lithium deposition amount estimated by the estimating unit.

According to the first aspect, second aspect, third aspect, and fourth aspect of the disclosure, the lithium deposition amount corresponding to the regenerative current flowing into the lithium-ion battery can be favorably estimated, so that it can be appropriately determined whether the lithium-ion battery is placed in the first state. Thus, it is possible to favorably report that the lithium-ion battery needs to be changed, by setting the first state to the time for change of the lithium-ion battery.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment

A vehicular control device of this disclosure determines a full-lock state of steering based on steering angle information of a steering wheel, and estimates the lithium deposition amount of a lithium-ion battery resulting from to the full-lock steering. In this manner, even where a current sensor cannot detect regenerative current that flows from an EPS motor into the lithium-ion battery, the control device can obtain the accumulated lithium deposition amount, and grasp the time for battery change, so that it can favorably report that the lithium-ion battery needs to be changed or replaced with a new one.

One embodiment of the disclosure will be described in detail with reference to the drawings.

Configuration

Figure 1:
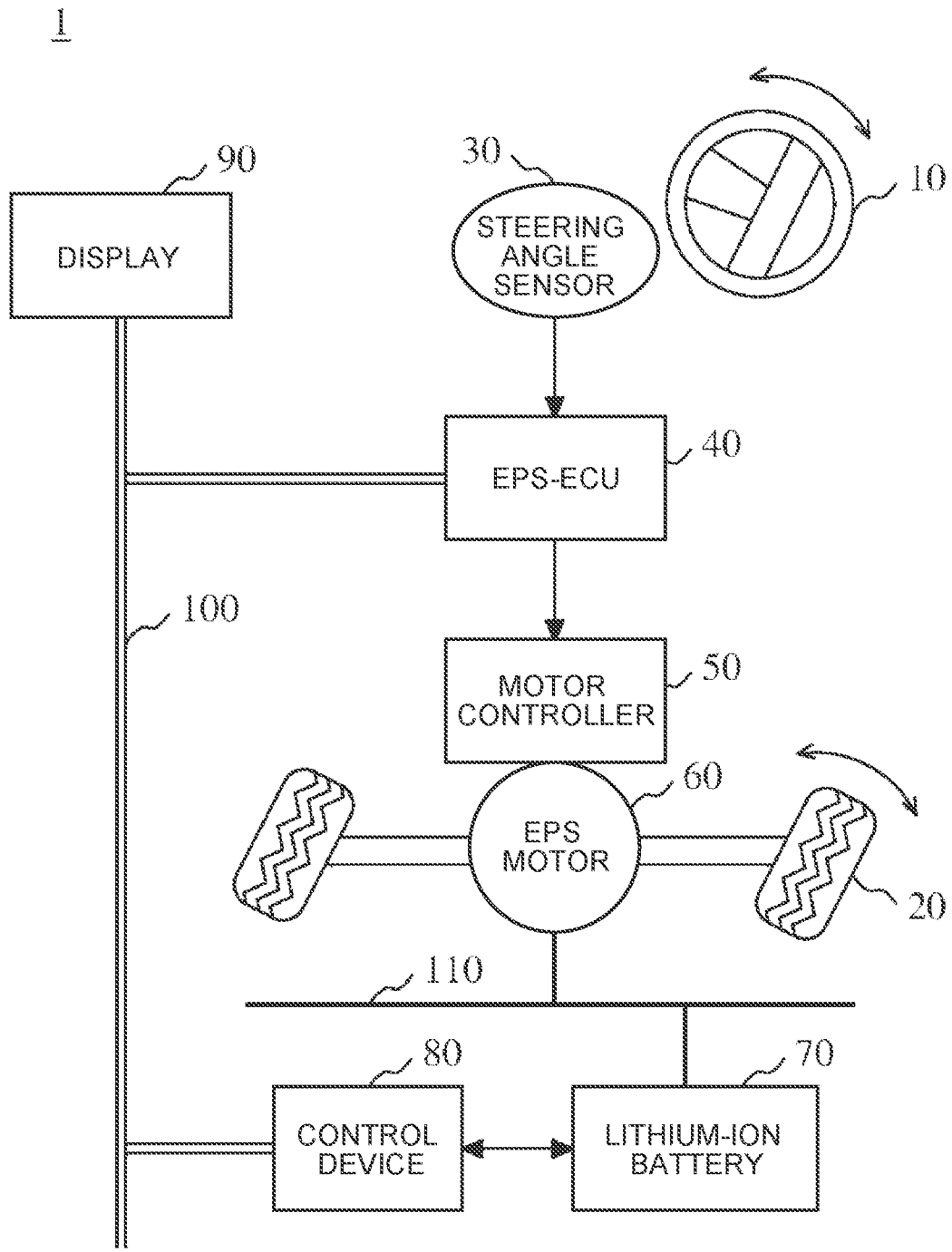
FIG. 1 is a view showing the general configuration of a vehicle steering system including a vehicular control device according to an embodiment.

FIG. 1 is a block diagram showing the general configuration of a vehicle steering system 1 including a vehicular control device according to one embodiment of the disclosure. In FIG. 1, the vehicle steering system 1 includes a steering wheel 10, steered wheels 20, steering angle sensor 30, EPS-ECU 40, motor controller 50, EPS motor 60, lithium-ion battery 70, control device 80 according to this embodiment, and display 90.

The EPS-ECU 40, control device 80, and display 90 are communicably connected to each other via an in-vehicle network 100, such as CAN (Controller Area Network). Also, the lithium-ion battery 70, which is rechargeable and dischargeable, is connected to the EPS motor 60 via a power line 110.

The steering wheel 10 and the steered wheels 20 are connected to each other, such that rotary motion produced by turning the steering wheel 10 is converted into motion for turning the steered wheels 20 in the vehicle width direction, and transmitted, via a steering mechanism (not shown) (including a steering shaft, tie rods, gear part, etc.).

The steering angle sensor 30, EPS-ECU 40, motor controller 50, and EPS motor 60 constitute an electric power steering system (EPS) that assists in steering operation by use of electricity.

The steering angle sensor 30 is mounted on a steering shaft (not shown) that makes rotary motions as a unit with the steering wheel 10, and detects the angle of rotation of the steering wheel 10 turned by the driver from its neutral position, as the steering angle. As one example, the steering angle sensor 30 sets the neutral position of the steering wheel 10 to zero, and detects a steering angle in the counter-clockwise direction as a positive value, and detects a steering angle in the clockwise direction as a negative value.

The EPS-ECU 40 is an electronic control unit (ECU) that controls the electronic power steering system. The EPS-ECU 40 sequentially obtains information (which will be called "steering angle information") including the steering angle detected by the steering angle sensor 30, and outputs a drive command for turning the steered wheels 20 to the motor controller 50, based on the obtained steering angle information. Also, the EPS-ECU 40 sends the steering angle information obtained from the steering angle sensor 30 to the control device 80, via the in-vehicle network 100.

The motor controller 50 controls rotation of the EPS motor 60, according to the drive command received from the EPS-ECU 40.

The EPS motor 60 rotates under control of the motor controller 50, and generates assist torque for assisting in turning of the steering wheel 10, on the steering shaft (not shown). Electric power for rotating the EPS motor 60 is supplied (discharged) from the lithium-ion battery 70 to the EPS motor 60, via the power line 110. Also, the EPS motor 60 can supply (charge) regenerative current to the lithium-ion battery 70, via the power line 110. The regenerative current is generated due to input power, such as input from a road surface, in a direction opposite to the turning direction of the steered wheels 20.

The lithium-ion battery 70 is a secondary battery configured to be rechargeable and dischargeable, and is a so-called auxiliary battery for supplying electric power to auxiliary electronic devices (e.g., lamps, such as head lamps and room lamps, air conditioners, such as a heater and a cooler, and devices for automated driving or advanced driving assistance) installed on the vehicle. Conditions of the lithium-ion battery 70 are monitored by the control device 80.

The control device 80 receives the steering angle information detected by the steering angle sensor 30, from the EPS-ECU 40, via the in-vehicle network 100. Then, the control device 80 determines whether full-lock steering has been performed, namely, whether the steering wheel 10 has been rotated to the maximum steering position in the counter-clockwise direction or clockwise direction, based on the received steering angle information.

Also, the control device 80 obtains vehicle information. More specifically, the control device 80 monitors conditions of the lithium-ion battery 70, using sensors (not shown) for detecting the voltage, current, and temperature, and obtains the temperature and state of charge (SOC) of the lithium-ion battery 70, as vehicle information, based on various kinds of information detected by these sensors. The state of charge can be derived by a known method using the voltage and current. Further, the control device 80 obtains, as vehicle information, the steering angle rate representing change of the steering angle of the steering wheel 10 turned by the driver, based on the steering angle information received from the EPS-ECU 40.

Also, the control device 80 estimates the lithium deposition amount of the lithium-ion battery 70 resulting from full-lock steering of the steering wheel 10, based on at least one of the steering angle rate, the temperature of the lithium-ion battery 70, and the state of charge of the lithium-ion battery 70, which are obtained as vehicle information. Then, the control device 80 determines that the lithium-ion battery 70 is placed in a state (first state) that requires battery change, based on the accumulated value of the lithium deposition amount thus estimated, and sends a reporting command as a request for reporting information concerning the time for change of the lithium-ion battery 70, to the display 90, via the in-vehicle network 100.

The whole or a part of the control device 80 may be typically configured as an electronic control unit (ECU) including a processor, storage medium, such as a memory, and input-output interface. The electronic control unit implements respective functions of determining full-lock steering as described above, estimating the lithium deposition amount, and giving a reporting command concerning the time for battery change, when the processor reads and executes a program stored in the memory.

The display 90 is a display device that can display requested information in the form of a message, according to the reporting command received from the control device 80. For example, a multi-information display (MID) provided in a meter device, center display, head-up display (HUD), a display of a navigation system, etc. may be used as the display 90.

Control

Figure 2:
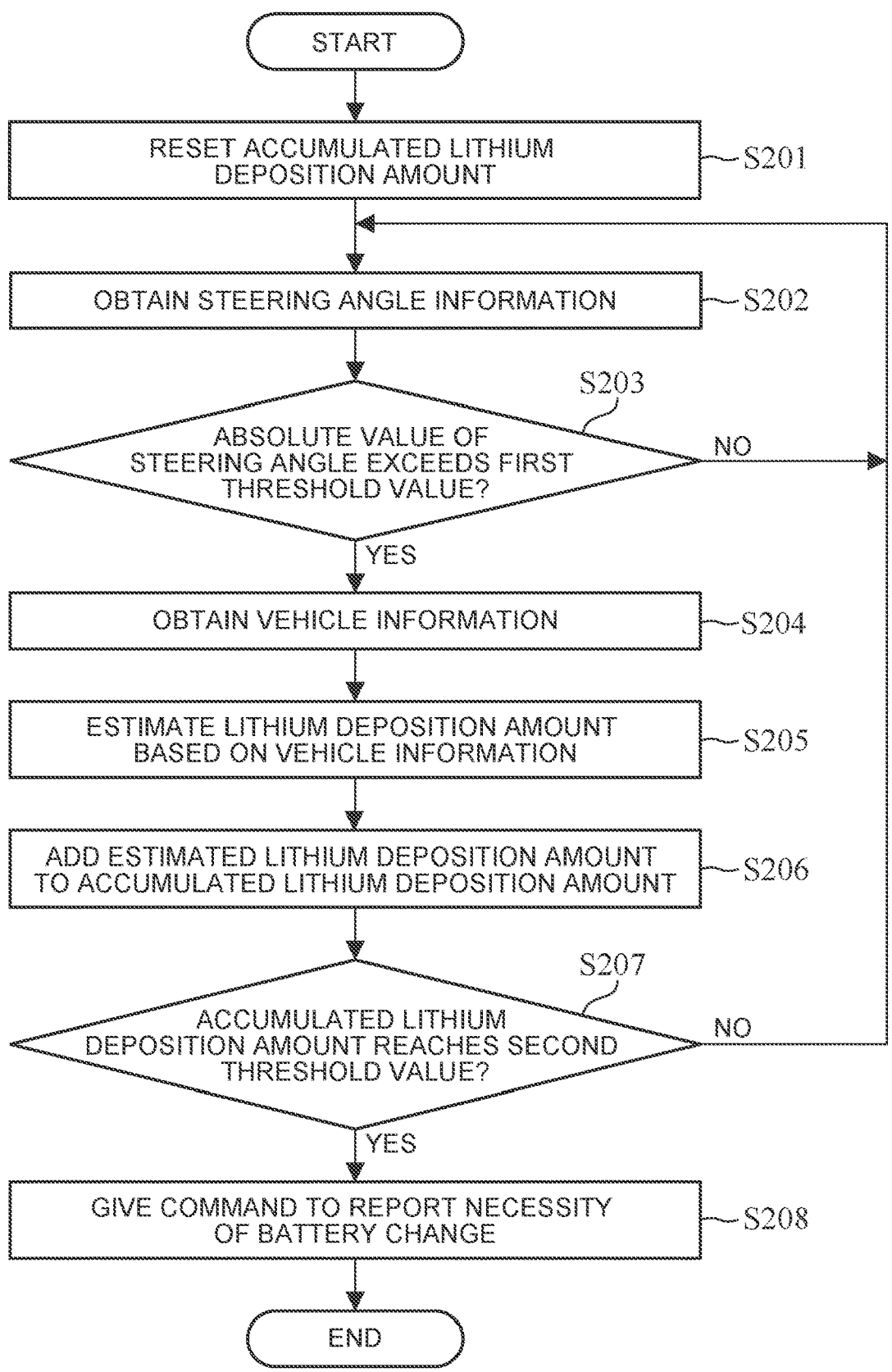
FIG. 2 is a flowchart illustrating a control routine of estimating the lithium deposition amount of a lithium-ion battery.

Referring further to FIG. 2, control performed by the control device 80 according to this embodiment will be described. FIG. 2 is a flowchart illustrating a control routine of lithium deposition amount estimation control executed by the control device 80, for estimating the lithium deposition amount of the lithium-ion battery 70.

The lithium deposition amount estimation control shown in FIG. 2 is started after the lithium-ion battery 70 is installed on (connected to) the vehicle for the first time, or after the lithium-ion battery 70 installed is replaced with a new one.

In step S201, the control device 80 performs initialization by resetting the accumulated lithium deposition amount stored, to zero. The accumulated lithium deposition amount is a value obtained each time the lithium deposition amount of the lithium-ion battery 70 is estimated through operation that will be described later, by cumulatively adding, or integrating, the estimated lithium deposition amount. After the accumulated lithium deposition amount is reset, the control proceeds to step S202.

In step S202, the control device 80 obtains the steering angle information detected by the steering angle sensor 30, from the EPS-ECU 40. The steering angle information includes information indicating the steering angle of the steering wheel 10 turned by the driver. After the steering angle information is obtained, the control proceeds to step S203.

In step S203, the control device 80 determines whether an absolute value of the steering angle of the steering wheel 10 exceeds a first threshold value, based on the steering angle information. The first threshold value is a predetermined angle that is set based on whether there is a possibility that regenerative current that has an influence on estimation of the lithium deposition amount flows into the lithium-ion battery 70. Typically, the first threshold value is the steering angle of the steering wheel 10 when the steering wheel 10 is at full lock. The angle at which the steering wheel 10 is actually at full lock may be set as the first threshold value, or an angle that is smaller than the angle at which the steering wheel 10 is at full lock by a predetermined margin may be set as the first threshold value. The margin may include a detection error of the steering angle sensor 30, for example. Since the range over which the steering wheel 10 can be operated is determined in advance depending on the vehicle, the control device 80 can determine whether the steering wheel 10 is in a full-lock state, based on the steering angle of the steering wheel 10.

When the absolute value of the steering angle of the steering wheel 10 exceeds the first threshold value (YES in step S203), the control proceeds to step S204. On the other hand, when the absolute value of the steering angle of the steering wheel 10 does not exceed the first threshold value (NO in step S203), the control proceeds to step S202.

In step S204, the control device 80 obtains vehicle information. The vehicle information includes at least one of the steering angle rate representing change of the steering angle of the steering wheel 10, the temperature of the lithium-ion battery 70, and the state of charge (SOC) of the lithium-ion battery 70. In this connection, the control device 80 is not necessarily required to obtain all of the steering angle rate, the temperature of the lithium-ion battery 70, and the state of charge of the lithium-ion battery 70, but it suffices that only the information used in operation of step S205 is obtained. After the vehicle information is obtained, the control proceeds to step S205.

In step S205, the control device 80 estimates the lithium deposition amount of the lithium-ion battery 70, which is generated because the absolute value of the steering angle exceeds the first threshold value, based on the obtained vehicle information. This estimation is performed based on at least one of the steering angle rate as an instantaneous value of the rate of change of the steering angle, the temperature of the lithium-ion battery 70, and the state of charge of the lithium-ion battery 70, at the time when the absolute value of the steering angle of the steering wheel 10 exceeds the first threshold value.

Figure 3:
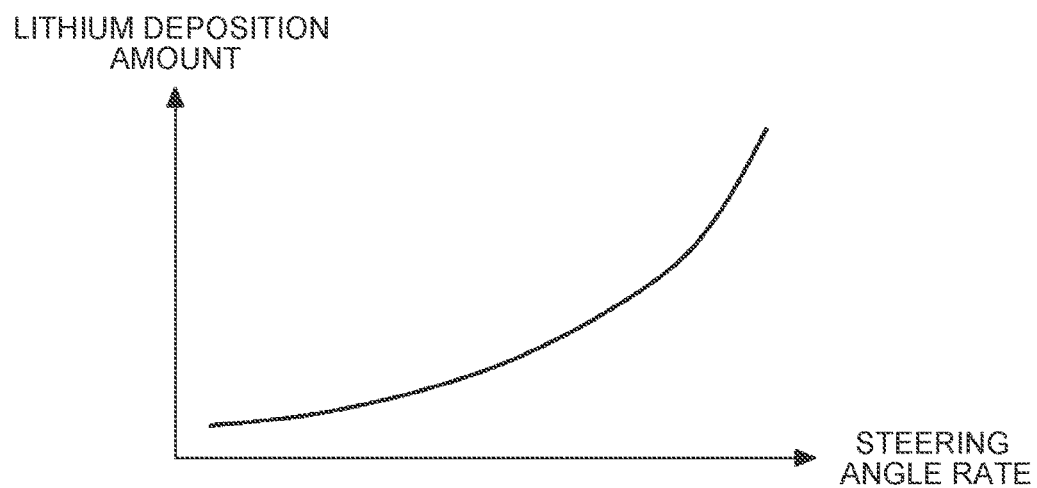
FIG. 3 is a view showing one example of the relationship between a steering angle rate of a steering wheel and the lithium deposition amount of the lithium-ion battery.
Figure 4:
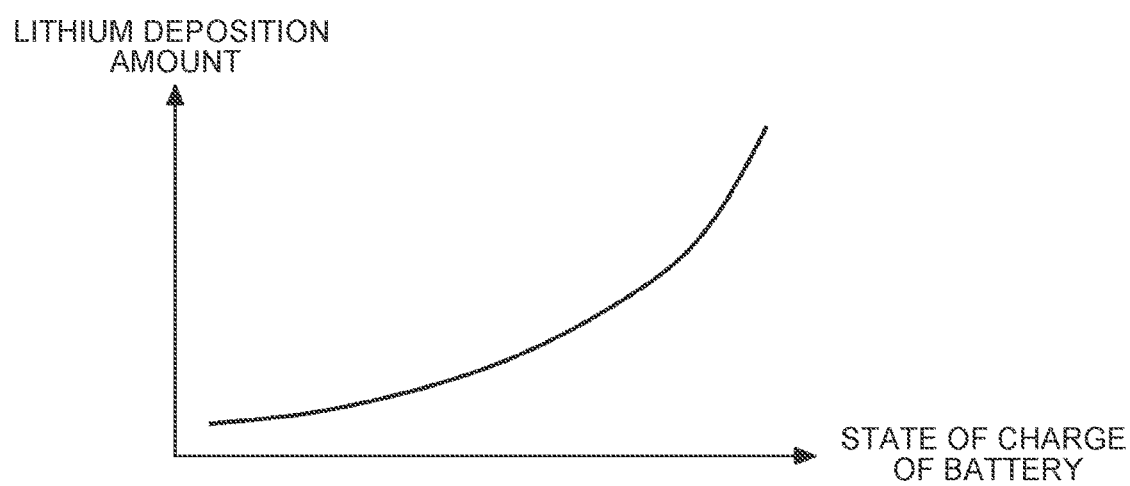
FIG. 4 is a view showing one example of the relationship between the state of charge of the lithium-ion battery and the lithium deposition amount.
Figure 5:
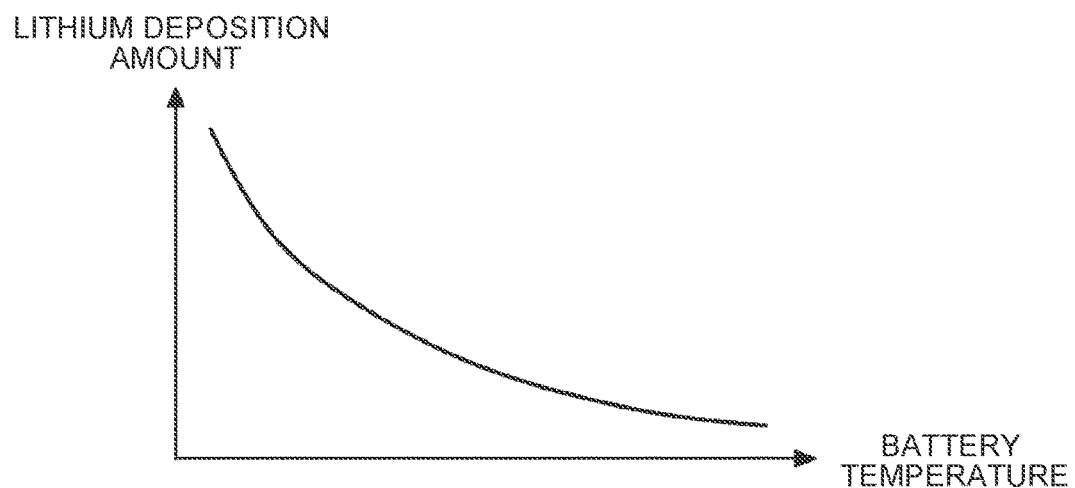
FIG. 5 is a view showing one example of the relationship between the temperature of the lithium-ion battery and the lithium deposition amount.

FIG. 3 shows one example of the relationship between the steering angle rate of the steering wheel 10, and the lithium deposition amount of the lithium-ion battery 70. As shown in FIG. 3, the lithium deposition amount increases as the steering angle rate is larger. FIG. 4 shows one example of the relationship between the state of charge of the lithium-ion battery 70 and the lithium deposition amount. As shown in FIG. 4, the lithium deposition amount increases as the state of charge of the lithium-ion battery 70 is higher. FIG. 5 shows one example of the relationship between the temperature of the lithium-ion battery 70 and the lithium deposition amount. As shown in FIG. 5, the lithium deposition amount increases as the temperature of the lithium-ion battery 70 is lower. The control device 80 estimates the lithium deposition amount of the lithium-ion battery 70, based on the relationship. The above relationships may be derived by evaluating the lithium-ion battery 70 in advance.

When the lithium deposition amount of the lithium-ion battery 70 is estimated using any two parameters of the steering angle rate, the state of charge of the battery, and the temperature of the battery, the relationships involving the two parameters may be expressed in the form of a two-dimensional map, for use in estimation of the lithium deposition amount. Also, when the lithium deposition amount of the lithium-ion battery 70 is estimated using all parameters of the steering angle rate, the state of charge of the battery, and the temperature of the battery, the relationships involving the three parameters may be expressed in the form of a three-dimensional map, for use in estimation of the lithium deposition amount.

In step S206, the control device 80 adds the lithium deposition amount of the lithium-ion battery 70 estimated in the above step S205, to the accumulated lithium deposition amount obtained so far, and stores the resulting lithium deposition amount. As the lithium deposition amount is accumulated, the performance of the lithium-ion battery 70 is more likely to be deteriorated. Thus, it is necessary to sequentially add the amount of lithium deposited, and grasp the total amount (lifetime deposition amount) of lithium deposited so far. After the addition of the lithium deposition amount ends, the control proceeds to step S207.

In step S207, the control device 80 determines whether the accumulated lithium deposition amount reaches a second threshold value. The second threshold value is a predetermined value used for determining deterioration of the lithium-ion battery 70. For example, when the lithium-ion battery 70 is evaluated in advance, a preferable second threshold value can be set, by identifying the lithium deposition amount with which the lithium-ion battery 70 deteriorates to a level lower than a given performance criterion, or the lithium deposition amount with which a given safety criterion cannot be sure to be met.

When the accumulated lithium deposition amount reaches the second threshold value (YES in step S207), the control proceeds to step S208. On the other hand, when the accumulated lithium deposition amount does not reach the second threshold value (NO in step S207), the control proceeds to step S202.

In step S208, the control device 80 sends a reporting command as a request for reporting that the lithium-ion battery 70 needs to be changed, to the display 90. In response to the reporting command, a message that promotes replacement of the lithium-ion battery 70, for example, is displayed on the display 90. As a method of reporting, it is also possible to generate sound or voice from a speaker (not shown), other than displaying a message, or the like, on the display 90. After the reporting command is generated, the lithium deposition amount estimation control ends.

In the illustrated embodiment, the command to report that the lithium-ion battery 70 needs to be changed is generated to the display 90 installed on the vehicle. However, the reporting command may be generated to equipment managed by a dealer of the vehicle or a vehicle management center that communicates with the vehicle, for example, in addition to or in place of the display 90. With the need for battery change thus reported, even where the user of the vehicle who was notified via the display 90 does not change the lithium-ion battery 70, for example, a third person, such as a sales person of the dealer or an operator of the vehicle management center, may encourage the user to change the lithium-ion battery 70.

Also, in the illustrated embodiment, the control device 80 receives the steering angle information detected by the steering angle sensor 30 from the EPS-ECU 40, determines that full-lock steering of the steering wheel 10 has been performed, based on the received steering angle information, and the steering angle rate of the steering wheel 10 at the time of the determination is obtained. However, the EPS-ECU 40 may determine whether full-lock steering has been performed, and obtain the steering angle rate of the steering wheel 10, and the EPS-EPU 40 may send the result of determination and the steering angle rate to the control device 80 via the in-vehicle network 100.

OPERATION AND EFFECTS

As described above, the vehicular control device according to one embodiment of the disclosure determines the full-lock state of steering, based on the steering angle information of the steering wheel 10 detected by the steering angle sensor 30, and estimates the lithium deposition amount of the lithium-ion battery 70 resulting from the full-lock steering. Then, the control device accumulates the estimated lithium deposition amount, and determines deterioration of the lithium-ion battery 70, based on the accumulated lithium deposition amount.

With this control, even when the current sensor cannot detect the regenerative current flowing from the EPS motor 60 into the lithium-ion battery 70 due to full-lock steering of the steering wheel 10, the amount of lithium metal deposited on the lithium-ion battery 70 according to the regenerative current can be estimated. Thus, the lithium deposition amount of the lithium-ion battery 70 corresponding to the regenerative current generated from the EPS motor 60 can be favorably estimated, so that it can be favorably reported that battery needs to be changed.

While one embodiment of the disclosed technology has been described above, this disclosure can be grasped, not only as the control device, but also as a control method of estimating the lithium deposition amount, which is executed by a control device having a processor and a memory, a control program of the method, a computer-readable non-temporary storage medium in which the control program is stored, or a vehicle on which a vehicle steering system including the control device is installed.

The vehicular control device of this disclosure can be used for a vehicle with an electric power steering function, on which a lithium-ion battery is installed.

What is claimed is:

1. A vehicular control device used in a vehicle on which a lithium-ion battery is installed, the vehicular control device comprising:
   a determining unit configured to determine whether an absolute value of a steering angle as a rotation angle of a steering wheel exceeds a first threshold value;
   an estimating unit configured to estimate a lithium deposition amount as an amount of lithium metal deposited on the lithium-ion battery by regenerative current flowing into the lithium-ion battery, based on vehicle information obtained from the vehicle, when the determining unit determines that the absolute value of the steering angle exceeds the first threshold value; and a reporting command unit configured to give a command to report that the vehicle is in a first state, based on the lithium deposition amount estimated by the estimating unit.

2. The vehicular control device according to claim 1, wherein the determining unit is configured to determine whether the absolute value of the steering angle exceeds the first threshold value, based on steering angle information obtained from a steering angle sensor installed on the vehicle.

3. The vehicular control device according to claim 1, wherein the reporting command unit is configured to report that the vehicle is in the first state, when the lithium deposition amount estimated by the estimating unit is accumulated, and the accumulated lithium deposition amount reaches a second threshold value.

4. The vehicular control device according to claim 1, wherein the vehicle information includes at least one of a steering angle speed measured when the steering wheel is operated, a temperature of the lithium-ion battery, and a state of charge of the lithium-ion battery.

5. The vehicular control device according to claim 1, wherein the first state is a state in which the lithium-ion battery needs to be changed.

6. The vehicular control device according to claim 1, wherein the reporting command unit is configured to report that the vehicle is in the first state, to at least one of a user of the vehicle, a dealer of the vehicle, and a vehicle management center configured to conduct communications with the vehicle.

7. A control method executed by a computer of a vehicular control device used in a vehicle on which a lithium-ion battery is installed, the control method comprising:
   determining whether an absolute value of a steering angle as a rotation angle of a steering wheel exceeds a first threshold value;
   estimating a lithium deposition amount as an amount of lithium metal deposited on the lithium-ion battery by regenerative current flowing into the lithium-ion battery, based on vehicle information obtained from the vehicle, when the absolute value of the steering angle exceeds the first threshold value; and
   giving a command to report that the vehicle is in a first state, based on the lithium deposition amount.

8. A non-temporary storage medium storing commands executable by one processor or a plurality of processors of a vehicular control device used in a vehicle on which a lithium-ion battery is installed, the commands causing the one processor or the plurality of processors to execute steps of:
   determining whether an absolute value of a steering angle as a rotation angle of a steering wheel exceeds a first threshold value;
   estimating a lithium deposition amount as an amount of lithium metal deposited on the lithium-ion battery by regenerative current flowing into the lithium-ion battery, based on vehicle information obtained from the vehicle, when the absolute value of the steering angle exceeds the first threshold value; and
   giving a command to report that the vehicle is in a first state, based on the lithium deposition amount.

9. A vehicle on which a lithium-ion battery is installed, the vehicle comprising a vehicular control device including:
   a determining unit configured to determine whether an absolute value of a steering angle as a rotation angle of a steering wheel exceeds a first threshold value;
   an estimating unit configured to estimate a lithium deposition amount as an amount of lithium metal deposited on the lithium-ion battery by regenerative current flowing into the lithium-ion battery, based on vehicle information obtained from the vehicle, when the determining unit determines that the absolute value of the steering angle exceeds the first threshold value; and
   a reporting command unit configured to give a command to report that the vehicle is in a first state, based on the lithium deposition amount estimated by the estimating unit.

* * * * *